United States Patent [19]

Hasegawa et al.

[11] Patent Number: 5,035,967
[45] Date of Patent: Jul. 30, 1991

[54] EMBOSSED TYPE SEPARATOR FOR A STORAGE BATTERY

[76] Inventors: Takao Hasegawa, 1892-1, Ikeda-chō, Ibi-gun; Hideo Endo, 630, Tarui-cho, Fuwa-gun, both of Gifu-ken, Japan

[21] Appl. No.: 274,731

[22] Filed: Nov. 14, 1988

Related U.S. Application Data

[63] Continuation of Ser. No. 654,041, Sep. 21, 1984, abandoned, and a continuation of Ser. No. 445,949, Dec. 1, 1982, abandoned.

[30] Foreign Application Priority Data

Dec. 3, 1981 [JP] Japan ................. 56-193707

[51] Int. Cl.$^5$ ............................................. H07M 2/18
[52] U.S. Cl. ..................................... 429/147; 429/251
[58] Field of Search ............ 429/146, 147, 246, 247, 429/249–252

[56] References Cited

U.S. PATENT DOCUMENTS

| 4,072,802 | 2/1978 | Murata et al. | 429/147 |
| 4,153,759 | 5/1979 | Murata et al. | 429/147 |
| 4,228,225 | 10/1980 | O'Rell et al. | 429/147 |
| 4,369,238 | 1/1983 | Hasegawa et al. | 429/252 |
| 4,430,394 | 2/1984 | Bechtold | 429/254 |

FOREIGN PATENT DOCUMENTS

| 268406 | 2/1969 | Austria | 429/147 |
| 54-13937 | 2/1979 | Japan | 429/147 |

Primary Examiner—Stephen J. Kalafut
Attorney, Agent, or Firm—Michael N. Meller

[57] ABSTRACT

The separator comprises an embossed, thin porous sheet of synthetic material and inorganic powder. The embossed pattern consists of a large number, e.g. 200 to 1300 per cm$^2$, of spherical projections of equal height arranged in vertical and horizontal rows at regular intervals and forming spherical cavities on the opposite side. The projections on one side are shifted from those on the opposite side so that there are alternating rows of projections and cavities on each side. Gas discharging passages are formed by the lines of communicating cavities and valleys between adjacent projections.

12 Claims, 2 Drawing Sheets

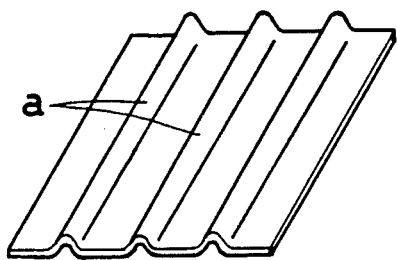
FIG.1
PRIOR ART
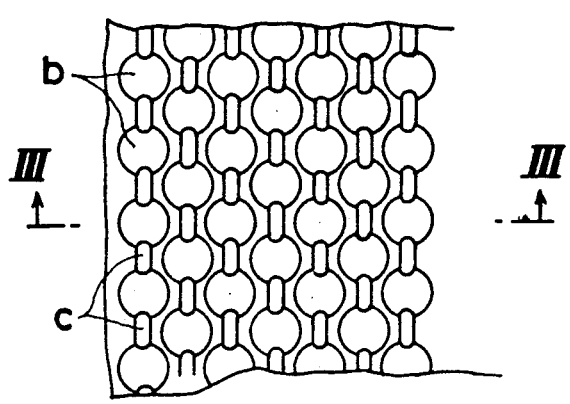
FIG.2
PRIOR ART
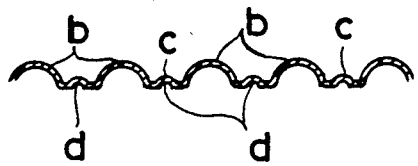
FIG.3
PRIOR ART
FIG.5
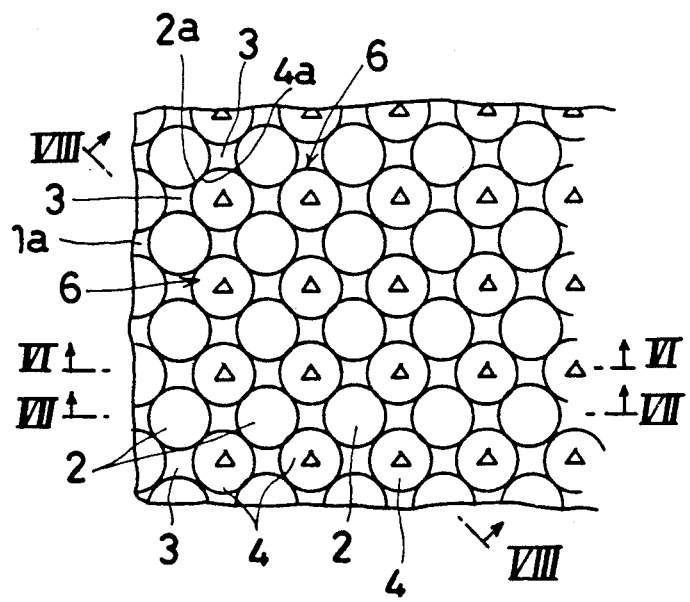
FIG.4
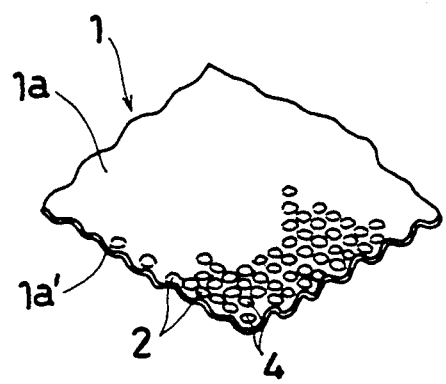

EMBOSSED TYPE SEPARATOR FOR A STORAGE BATTERY

This application is a continuation of application Ser. No. 654,041, filed 9/21/84, and a continuation of Ser. No. 445,949, filed 12/1/82, both now abandoned.

BACKGROUND OF THE INVENTION

This invention relates to an embossed type separator suitable for use in lead-acid storage batteries.

With the decrease in size and weight of storage batteries, the separator used hitherto has measured 0.5 mm or less in thickness, so that it has been usual to use it in combination with a glass mat in layers or to provide it with ribs in order to provide a space of 1 mm or more between the positive plate and the negative plate of the cell of the battery. However, this type of separator is defective in that such a combination is troublesome and attachment of the ribs thereto involves a waste of additional time and labor, resulting in a rise in manufacturing cost. In order to avoid these disadvantages, there has been proposed a type of thin separator embossed to form long ribs extending in the vertical direction in order to increase its apparent thickness so that it has become unnecessary to use the separate glass mat in combination with the separator or to attach ribs thereto. This separator, however, has the disadvantage that it cannot withstand the pressure from the positive plate and the negative plate of a cell of a storage battery, and therefore it is liable to be deformed. In addition, it has to be used in such a condition that its ribs may be positioned to extend vertically in order to take into consideration the discharge of gases which are passed therethrough.

There has also been known an embossed type of separator having a large number of large and small embossed projections. However, this embossed type of separator is inconvenient in that, since the concave and convex forms of both surfaces are different from one another, when they are interposed between a positive plate and a negative plate, special care has to be taken so that its right side surfaces may face the right plates, respectively, and thus the use thereof is troublesome. This also causes difficulty in the discharging of gases. Furthermore, since they are made by embossing on the same side surface a large number of small projections in the form of a V-shape in section, the top portion of the small projections are formed by being given especially a sudden deformation by pincer pressure applied from both sides of the separator during embossing, and this often results in cracks or breaks on the top portions thereof, and a production loss results.

SUMMARY OF THE INVENTION

This invention has as its object the provision of an embossed type separator for a storage battery which is free from the foregoing defects, can be smoothly manufactured without being cracked or broken, has substantially the same embossed forms on both side surfaces thereof making it easier to use, has an improved resistance to pressure, permits easier discharge of gases resulting in improved battery operation.

The embossed type separator according to this invention comprises a thin porous sheet provided, by embossing, on both side surfaces thereof with a large number of spherical projections so that those on each side surface thereof are of the same height and are arranged vertically and horizontally at regular intervals in numerous vertical and horizontal rows and that those on one side surface and those on the other side surface are shifted in position alternately with one another. Thus each side surface has a uniform concave and convex configuration so that the spherical projections projecting toward one side and the spherical cavities defined by the respective rear surfaces of the spherical projections protruding toward the other side are uniformly arranged vertically and horizontally in their mutually alternately shifted positions so that there are formed a large number of vertical and horizontal crossing lines of gas discharging groove passages each of which is composed of an alternately arranged and mutually communicated line of spherical cavities arranged in line and valley spaces formed in a line between every adjacent two of the spherical projections arranged in adjacent rows.

The spherical projections formed on each side surface of the separation are arranged in a large number of vertical and horizontal rows and the spherical cavities formed thereon are arranged vertically and horizontally in their shifted position in relation to the spherical projections. The projections and cavities are disposed so close to each other that substantially no flat area is left between the circumferential edge of the base of each of the spherical projections and the edge of the open base of each of the spherical cavities so that the density of the spherical projections provided is substantially the maximum possible.

BRIEF DESCRIPTION OF DRAWINGS

FIG. 1 is a perspective view of a prior art separator;

FIG. 2 is a plan view of part of another prior art separator;

FIG. 3 is a sectional view taken along the line III—III in FIG. 2;

FIG. 4 is a perspective view of a preferred embodiment of this invention;

FIG. 5 is a plan view of part of the example shown in FIG. 4;

DETAILED DESCRIPTION

Figure 6:
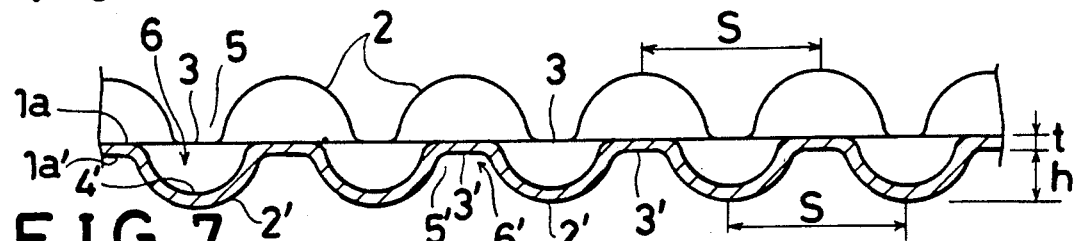
FIG. 6 is a sectional view taken along the line VI—VI in FIG. 5.

FIG. 1 shows a conventional prior art separator with ribs a.

FIG. 2 shows another conventional prior art separator having large and small embossed projections b and c, respectively.

FIG. 3 is a cross-section along lines III—III of FIG. 2.

This invention will be explained in greater detail with reference to the accompanying drawings. FIGS. 4 to 9 show a preferred embodiment of the invention. Numeral 1 denotes an embossed type separator given as a preferred embodiment of the present invention. This separator 1 is so manufactured that a thin, porous, paper machine-made sheet of, for example, 0.3 mm in thickness, comprising, for instance, a synthetic pulp of polyethylene or the like, synthetic long fibers of acrylic resin or the like, and an inorganic powder such as silica, calcium silicate, kaolin, clay, talc or the like, is embossed on both side surfaces thereof as explained in detail below and is then cut to a predetermined size.

This separator 1 has on both side surfaces 1a and 1a' a large number of spherical projections, 2 and 2', respectively, and those on each side surface are the same in height and are arranged vertically and horizontally at regular intervals 3 of 2.8 mm to 7.0 mm in a large number of vertical and horizontal rows. Each of said spherical projections has a height h ranging from 0.35 mm to 0.75 mm and a base diameter ranging from 2.0 mm to 5 mm. More specifically, this separator 1 is provided by embossing one side surface 1a thereof with a large number of spherical projections 2 of the same height. These are arranged vertically and horizontally at regular intervals 3 in a desired large number of vertical and horizontal rows and by embossing the other side 1a' with a large number of spherical projections 2'. These are the same height arranged at regular intervals 3' that are of the same dimension as intervals 3. They are, however, shifted in position vertically and horizontally in relation to projections 2 on one side surface 1a in a large number of vertical and horizontal rows, so that the spherical projections 2 on one side surface 1a and the spherical projections 2' on the other side surface 1a', have alternately vertically and horizontally shifted arrangement relationships.

Thus, there are formed on each side surface 1a and 1a' of the separator a large number of spherical cavities 4 and 4' respectively. Each of these is defined by the rear surface of each of the respective spherical projections 2' and 2 protruding toward one side as viewed from the other side. Each spherical cavity 4 and 4' is an opening located at the center of an area surrounded by four spherical projections 2 and 2', respectively, and these spherical cavities 4 and 4' are lined up vertically and horizontally substantially at the same regular intervals 3' and 3, respectively. As a result there are formed on side surface 1a and 1a' of the separator 1 numerous alternating vertical and horizontal rows of spherical cavities 4' and 4, respectively, with each of the spherical cavities 4 and 4' having the same depth and base diameter as those of each of the spherical projections 2 and 2'.

Consequently, the embossed type separator 1 of the present invention is obtained as a non-directional type uniformly provided with equally shaped spherical projections and spherical cavities all over both side surfaces thereof. Thus when either side surface is put in contact with either a negative or a positive plate of a storage battery, the same or equal contact pressure is applied thereto. Accordingly, this novel separator is very convenient to use, and also since each side surface thereof forms a pressure contact surface comprising the spherical projections 2 and 2' uniformly distributed so that it can be sufficiently and uniformly brought in pressure contact with an electrode plate, the separator is particularly effective in preventing active material from falling off from the positive plates. At the same time it can serve as a stable-performance separator which is highly effective in withstanding pressure and bending force from the pincer pressure applied by the positive and negative plates of the battery. In FIG. 5, the spherical cavities 4 are each indicated with a triangular mark.

Figure 8:
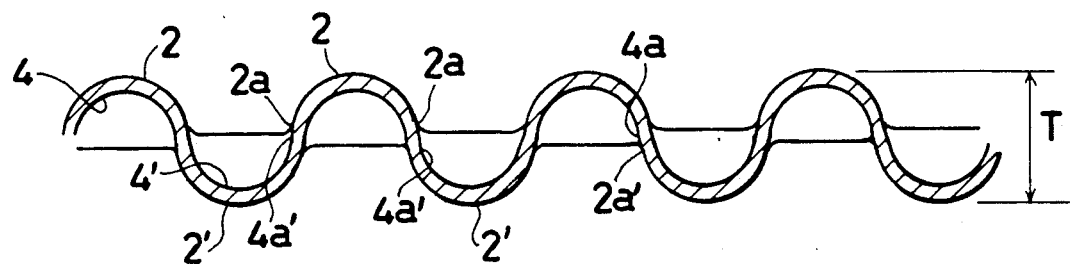
FIG. 8 is a sectional view taken along the line VIII—VIII in FIG. 5.

As a result of much experimental research, it has been determined that, in order to provide optimum performance with respect to contact pressure, gas discharge, and pressure resistance, the number of spherical projections 2 and the number of spherical cavities 4 should both be 200 to 1300 per 100 cm$^2$ on each side surface 1a or 1a' of the separator. In the illustrated example, the separator has on both side surfaces 1a and 1a' spherical projections which are so arranged as to provide the largest density per unit area so that the separator may have the best resistance to pressure. Namely, the circumferential edges 2a and 2a' of each of the spherical projections 2 and 2', respectively, and the circumferential edges 4a and 4a' of each of the spherical cavities 4 and 4', respectively, on each side of the separator are so continuously adjacent to each other as to leave substantially no flat area on the sheet therebetween as shown in FIG. 8. Thus, there is produced an embossed type separator having the closest packed arrangement of spherical projections 2 and 2' thereon.

Further, in order to obtain good pressure resistance, the distance or spacing between any two adjacent circumferential edges 2a and 4a or 2a' and 4a' is up to one quarter ($\frac{1}{4}$) of the base diameter of the spherical projection or the spherical cavity.

Thus, on each side surface 1a or 1a' of the embossed type separator 1 of this invention a large number of valley spaces 5 and 5' are formed between adjacent rows of a large number of spherical projections 2 and 2', respectively. These are equally distributed as mentioned above so as to be arranged at regular intervals in a large number of vertical and horizontal rows with the base of each of said valley spaces 5 and 5' thus being the interval 3 and 3', respectively, left between any two neighboring spherical projections 2 and 2', respectively. Moreover, the respective valley spaces 5 and 5' arranged in rows vertically and horizontally communicate with the spherical cavities 4' and 4, respectively, the latter being arranged in vertical and horizontal rows so that there are formed, as a whole, on side surfaces 1a and 1a', respectively, a large number of vertical and horizontal crossing lines of grooved gas discharge passages 6 and 6', respectively. These gas discharge passages 6 and 6' consist of an alternately arranged and mutually communicated line of the valley spaces 5 and 5', respectively, and the spherical cavities 4' and 4, respectively.

Figure 7:
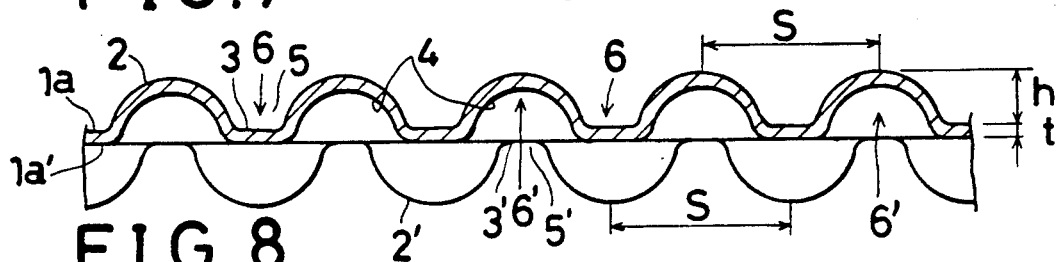
FIG. 7 is a sectional view taken along the line VII—VII in FIG. 5.
Figure 9:
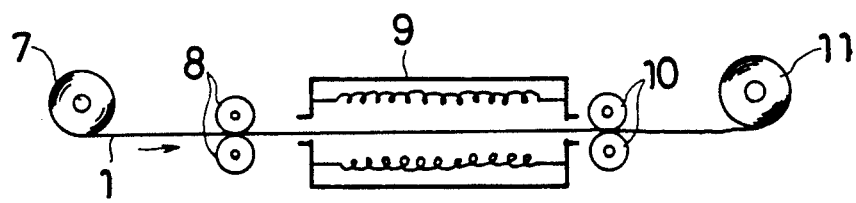
FIG. 9 is a diagrammatic side view of a manufacturing apparatus for a storage battery separator of this invention.
Figure 10:
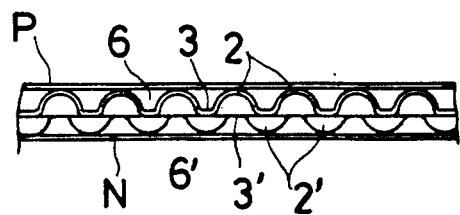
FIG. 10 is a top view of part of the separator of this invention in use.

Vertical sectional forms of the separator 1 of this invention are the same as the horizontal sectional forms shown in FIGS. 6 and 7, and therefore their drawings are omitted. Consequently, when the separator 1 made according to this invention is interposed between a positive plate P and a negative plate N, a large number of vertical passage gaps for facilitating gas discharge are securely formed between either side of the separator and the side of either the negative or positive plate which confronts the separator, owing to the above-mentioned many vertical lines of said grooved gas discharge passages 6 or 6' (see FIG. 10). Even when said separator 1 is reversed in its direction facing the plates, there are formed similarly vertical passage gaps serving as good gas discharge passages between the separator and either the positive or negative plate, and thus the separator is convenient to use in that it can be used readily without considering its facing directions. In addition, even when said separator is interposed between the plates in such a condition that it is turned by 90 degrees so as to change the direction of the vertical gas exhaust passages to horizontal passages, the aforementioned horizontal lines of said gas discharge 6 and 6' become the vertical ones and maintain the same good efficient gas discharge performance as above, thereby avoiding the disadvantage inherent in the conventional embossed type separator. FIG. 9 shows an apparatus for manufacturing an embossed type separator of this invention wherein numeral 7 denotes a sheet unrolling (supply) roll, numeral 8 denotes a pair of pinch rolls, numeral 9 denotes an oven, numeral 10 denotes a pair of embossing steel rolls, and numeral 11 denotes a sheet take-up roll. The embossing rolls 10, provided respectively on the peripheral surfaces thereof with spherical projections and spherical cavities formed by engraving in advance so as to be identical with the above-mentioned embossed surface of the separator of this invention, are disposed in such relation to each other that said spherical projections on one roll of the pair may be engaged properly with the spherical cavities on the other roll while maintaining a suitable gap therebetween. The embossing type separator of this invention is, for example, manufactured by using this manufacturing apparatus as follows:

EXAMPLES

Example 1

A roll of a long, paper machine-made porous sheet A measuring 0.3 mm in thickness and comprising 40% by weight of polyethylene synthetic pulp, 15% by weight of acrylic long fibers of 1.5 deniers in fineness and 5 mm in length, and 45% by weight of amorphous silica powder having a specific surface area of 180 $m^2/g$, is unrolled from the sheet unrolling (supply) roll 7, fed at a supply speed of 20 m/min into the 20-m long oven 9 kept heated at 120° C., and preheated therein being passed therethrough. This preheated sheet A is then passed between the aforementioned pair of embossing rolls 10 so disposed as to confront each other and leave a gap of 0.3 mm therebetween. The entire peripheral surface of each of rolls 10 is provided, by engraving with a large number of hemispherical projections, each measuring 0.5 mm in height and 3.5 mm in the bottom diameter, with an interval of 4.9 mm being left between the centers of every adjacent two hemispherical projections and an interval of 4.9 mm being left between the centers of every adjacent two hemispherical cavity portions. Thus, the pair of embossed rolls 10, having peripheral surfaces corresponding to the embossed surfaces of the separator shown in FIG. 4, are disposed to engage each other so as to leave a gap of 0.3 mm therebetween.

Thus, the separator sheet is embossed on both side surfaces by means of such a pair of embossing rolls 10, is taken up by the take-up roll 11, and is then cut to a predetermined size to obtain a large number of products of this invention as shown in FIG. 4. This embossed type separator thus obtained has such a form or configuration that the apparent thickness T or overhall height thereof is 1.2 mm and each of both side surfaces 1a and 1a' thereof has approximately 400 spherical projections 2 or 2' and approximately 400 spherical cavities 4 and 4', respectively, per 100 $cm^2$ of the separator. Each spherical projection (or cavity) measures 0.5 mm in height (or depth) and 3.5 mm in the base diameter of the projection (or cavity), and the distance S between the centers of any two adjacent spherical projections 2 or 2', and accordingly, also the distance between the center of any two adjacent spherical cavities 4 or 4', is 4.9 mm. The closest packed spherical projections and cavities, leaving no flat space therebetween and consequently being high in mechancial strength, are formed on both side surfaces thereof. As for its porosity, since the embossing rolls used to emboss the sheet material are so disposed to leave therebetween a gap equivalent to the thickness of the sheet material, the embossed separator has the same porosity as the original porosity of the sheet material unchanged by embossing. When measured in accordance with JIS C 2312, its electric resistance was found to have a comparatively small value of 0.007 $\Omega/dm^2$. Also its deformation rate by pressure has been found to be 20%. This result is obtained by measuring the apparent thickness of a sample before a pressure deformation test, immersing the sample in dilute aqueous sulfuric acid solution with a specific gravity of 1.30 at 50° C. under a load of 20 kg/100 $cm^2$ and after this immersion, measuring the apparent thickness of the wet sample. The reduced rate of the thickness on the basis of the initial thickness is indicated by percentage.

Example 2

A formed, porous separator sheet material of 0.3 mm in thickness, comprising 50% by weight of polyethylene resin and the remaining 50% by weight of amorphous silica powder having a specific surface area of 180 $m^2/g$, is embossed as in Example 1 to obtain a product that is the same in form as that of the Example 1. Its electric resistance is 0.008 $\Omega/cm^2$ and its pressure deformation rate is 20%.

Example 3

The same porous sheet material as used in Example 1 is embossed with a pair of embossing rolls whose projection/cavity patterns are the same as those used in Example 1 but are enlarged by a factor of 1.4, so that an embossed type separator having on each side surface thereof 200 of each of said spherical projections and cavities per 100 $cm^2$ and measuring 1.8 mm in apparent thickness is obtained. Its electric resistance is 0.007 $\Omega/dm^2$ and its pressure deformation rate is 35%.

Example 4

The same porous sheet material as used in Example 1 is embossed by means of a pair of embossing rolls whose projection/cavity patterns are the same as those used in Example 1 but are reduced in size compared to Example 1 by a factor of 0.6, so that an embossed type separator having on each side surface thereof approximately 1250 of each of said spherical projections and cavities per 100 $cm^2$ and measuring 1.8 mm in apparent thickness is obtained. Its electric resistance is 0.007 $\Omega/dm^2$ and its pressure deformation rate is 9%.

As a result of much experimental research, it has been found that the closest packed type embossed separator of the form as shown in FIG. 4 gives optimum gas-discharge and pressure-resisting properties when the number of said spherical projections (that is, the number of said spherical cavities) per 100 $cm^2$ provided on each side surface thereof is within the range of approximately 200 to 1300. On the other hand, a sufficient pressure resistance cannot be obtained when the number of projections/cavities is 150 or so per 100 $cm^2$ and it is difficult to obtain a favorable apparent thickness. At the same time, there is a remarkable decrease in both the rapid electric discharging property and service life of the battery when the number of projections/cavities is 1400 or more per 100 $cm^2$.

Further, it has been found that it is preferable to limit the space between said adjacent two spherical projections and that between said adjacent two spherical cavities on each side surface of the separator to at most a quarter or less of the base diameter of either the spherical projection or cavity. If said space is greater than that, it causes a remarkable lowering in the pressure resistance of the separator and this is undesirable.

Thus, according to this invention, the porous thin sheet is provided, by embossing, on both side surfaces thereof with a large number of spherical projections so that those on each side surface thereof are the same in height and are arranged in numerous vertical and horizontal rows, and those on both side surfaces thereof are shifted in position from one another alternately with each other. Thus, both side surfaces have such a uniform convex and concave form that numerous vertical and horizontal rows of said spherical projections of the same height and numerous vertical and horizontal rows of said spherical cavities of the same depth are uniformly arranged, shifted in position from one another and alternately with one another and at the same time numerous vertical and horizontal crossing lines of gas discharging passages, each of which is composed of an alternately arranged and mutually communicated line of valley spaces formed between every two adjacent spherical projections of adjacent rows and the aligned spherical cavities. Therefore, this separator not only can eliminate the nuisance of taking special care to orient it in the proper direction as required with the conventional type of separator when it is to be interposed between a positive plate and a negative plate of a cell of a storage battery, but this separator also can provide between each side thereof and the negative or positive electrode plates confronting said side a uniform contacting pressure and numerous vertical passage gaps for gas discharge. Also in this case it can be assured that said numerous vertical passage gaps for gas discharge are always formed without paying any attention to the vertical or horizontal direction thereof when it is interposed therebetween, so that it is very convenient to use. Especially when the separator is of the type that it is provided with the closest packed spherical projections which are arranged to be as close to one another as possible, its pressure resistance and bending strength can be increased remarkably.

Further, since this invention separator is so provided that the embossed projections and cavities may be formed into spherical ones, it can be smoothly manufactured without production loss due to cracks, breaks, or the like that are liable to occur with the conventional type manufactured so that the sheet is embossed to form V-shaped projections. It is obvious that various changes and modifications may be made in the details of the invention without departing from the general spirit thereof as set forth in the appended claims.

We claim:

1. An embossed type separator for a storage battery comprising a thin porous sheet provided, by embossing, on both side surfaces thereof a large number of spherical projections of equal height and diameter arranged at regular intervals in numerous vertical and horizontal rows and wherein the spherical projections on one side surface and those on the other side surface are shifted in position alternately with one another in the vertical and horizontal directions, thus forming on each side surface the same uniform concave and convex pattern so that the spherical projections projecting towards one side and spherical cavities defined by the respective rear surfaces of the spherical projections protruding toward the opposite side are uniformly arranged vertically and horizontally in their mutually alternately shifted positions and so that there are formed a large number of vertical and horizontal crossing lines configured to act as gas discharging groove passages each of which is composed of an alternately arranged and mutually communicating line of spherical cavities and valley spaces formed between every adjacent two of the spherical projections arranged in adjacent rows, said spherical cavities and projections having substantially the same diameter said spherical projections formed on each side surface of said separator being arranged in a large number of vertical and horizontal rows and the spherical cavities formed on said surfaces being arranged vertically and horizontally in their shifted position in relation to the spherical projections, and said projections and cavities being disposed so close to each other that there is left no flat area between the circumferential edge of the base of each of the spherical projections and that of the open base of each of the spherical cavities so that the circumferential base of each depression is in direct contact with the circumferential bases of its four neighboring projections without leaving any flat space therebetween, said cavities and projections forming the same pattern on both sides of said separator.

2. The embossed type separator as claimed in claim 1, wherein the density of spherical projections and spherical cavities per 100 cm$^2$ on each side surface is in the range between 200 to 1300.

3. The embossed separator as claimed in claim 1, wherein the thickness of the sheet is in the range of 0.2 mm to 0.5 mm and the apparent thickness of the separator is in the range of 0.7 mm to 2.0 mm.

4. The embossed type separator as claimed in claim 1, wherein the height of each spherical projection on each side surface is in the range of 0.35 mm to 0.75 mm, the base diameter of each spherical projection is in the range of 2.0 mm to 5.0 mm, the distance between adjacent two of the projections is in the range of 2.8 mm to 7 mm, and the apparent thickness of the separator is in the range of 0.7 mm to 2.0 mm.

5. The embossed type separator as claimed in claim 1, wherein the thin porous sheet comprises 30–60% by weight of a synthetic resin pulp, 10–30% by weight of long synthetic fibers, and 10–60% by weight of an inorganic powder.

6. The embossed type separator as claimed in claim 1, wherein the thin porous sheet consists of 30–60% by weight of a synthetic resin and 70–40% by weight of an inorganic powder.

7. The embossed type separator as claimed in claim 5, wherein said synthetic resin is a thermoplastic resin.

8. The embossed type separator as claimed in claim 6, wherein said synthetic resin is a thermoplastic resin.

9. The embossed type separator as claimed in claim 7, wherein said synthetic resin is polypropylene.

10. The embossed type separator as claimed in claim 8, wherein said synthetic resin is polypropylene.

11. The embossed type separator as claimed in claim 5, wherein said inorganic powder is at least one selected from the group consisting of silica, calcium silicate, kaolin, clay, talc and diatomaceous earth.

12. The embossed type separator as claimed in claim 6, wherein said inorganic powder is at least one selected from the group consisting of silica, calcium silicate, kaolin, clay, talc and diatomaceous earth.

* * * * *